United States Patent
Fisher et al.

(10) Patent No.: US 7,750,814 B2
(45) Date of Patent: *Jul. 6, 2010

(54) HIGHLY PORTABLE SYSTEM FOR ACOUSTIC EVENT DETECTION

(75) Inventors: Ken S Fisher, Los Angeles, CA (US); Kevin Baxter, Saugus, CA (US); Scott Manderville, Georgetown, IN (US)

(73) Assignee: Shotspotter, Inc., Santa Clara, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 10/905,788

(22) Filed: Jan. 20, 2005

(65) Prior Publication Data

US 2005/0237186 A1 Oct. 27, 2005

Related U.S. Application Data (63) Continuation-in-part of application No. 10/248,511, filed on Jan. 24, 2003, now Pat. No. 6,847,587.

(60) Provisional application No. 60/481,922, filed on Jan. 20, 2004.

(51) Int. Cl.
*G08B 23/00* (2006.01)

(52) U.S. Cl. .................................................. 340/573.1

(58) Field of Classification Search ............. 340/573.1, 340/426.19, 506, 539.13, 995.28, 521, 691.6, 340/825.36; 367/127

See application file for complete search history.

(56) References Cited

U.S. PATENT DOCUMENTS

| | | | | | |
|---|---|---|---|---|---|
| 4,091,366 | A | * | 5/1978 | Lavallee | 340/524 |
| 5,455,868 | A | * | 10/1995 | Sergent et al. | 381/56 |
| 5,504,717 | A | * | 4/1996 | Sharkey et al. | 367/124 |
| 5,586,086 | A | * | 12/1996 | Permuy et al. | 367/127 |
| 5,973,998 | A | * | 10/1999 | Showen et al. | 367/124 |
| 6,028,514 | A | * | 2/2000 | Lemelson et al. | 340/539.13 |
| 6,178,141 | B1 | * | 1/2001 | Duckworth et al. | 367/127 |
| 6,392,692 | B1 | * | 5/2002 | Monroe | 348/143 |
| 6,545,601 | B1 | * | 4/2003 | Monroe | 340/521 |
| 2002/0003470 | A1 | * | 1/2002 | Auerbach | 340/425.5 |
| 2004/0100868 | A1 | | 5/2004 | Patterson et al. | |
| 2004/0131498 | A1 | * | 7/2004 | Kuutti | 422/58 |
| 2005/0101872 | A1 | * | 5/2005 | Sattler et al. | 600/483 |
| 2006/0132382 | A1 | * | 6/2006 | Jannard | 345/8 |

* cited by examiner

*Primary Examiner*—Phung Nguyen
(74) *Attorney, Agent, or Firm*—DLA Piper LLP (US)

(57) ABSTRACT

A man wearable acoustic sensor for use with a gunshot detection system. In a preferred embodiment the inventive sensor includes: a housing configured to be man wearable, a microphone; a processor housed within the housing and in communication with the microphone to detect an acoustic event and determine a time of arrival for the acoustic event; a GPS receiver for providing position information to said processor; a network; and a display for displaying information concerning acoustic events to a user. Man wearable describes a sensor which is either integrated into a piece of equipment normally carried by a soldier or integrated into an article of clothing or configured to securely attach to such equipment or clothing.

28 Claims, 8 Drawing Sheets

HIGHLY PORTABLE SYSTEM FOR ACOUSTIC EVENT DETECTION

This application hereby claims priority back to U.S. Provisional Application Ser. No. 60/481,922, filed on Jan. 20, 2004, and is a continuation-in-part of U.S. patent application Ser. No. 10/248,511 by Patterson, et al., filed Jan. 24, 2003, both of which are hereby incorporated by reference as if set forth fully herein.

BACKGROUND OF THE INVENTION

The present invention relates to a system and method for detecting and locating an acoustic event. More particularly, but not by way of limitation, the present invention provides a highly portable gunshot detection system.

Gunfire and sniper detection systems are generally known in the art. Such systems can be broadly grouped into three categories: systems which pinpoint the precise location of the source of gunfire; azimuthal sensors which provide an indication of the radial direction to the source of gunfire; and proximity sensors which merely provide an indication that nearby gunfire was detected. While such systems have been demonstrated to perform in both law enforcement and military applications, the entire field is presently an emerging technology.

In many large cities, gun-related violence has become a plague of epidemic proportions. Urban gunfire, whether crime-related or celebratory in nature, results in thousands of deaths per year in the United States alone. Gunfire location systems, such as those installed in the Redwood City, Calif., Glendale, Ariz., Willowbrook, Calif., City of Industry, Calif., and Charleston, S.C. areas, have proven to be effective in reducing law enforcement response time to detected gunfire, apprehending criminals, collecting evidence, and reducing the occurrence of celebratory gunfire. One such system is described in U.S. Pat. No. 5,973,998, issued to Showen, et al., which is incorporated herein by reference.

Showen, et al. discloses a system wherein sensors are placed at a density of roughly six to ten sensors per square mile. Audio information is sent to a computer at a central location and processed to: detect a gunshot; determine a time of arrival for the gunshot at each sensor; and calculate a location of the shooter from the differences in the times of arrival at three or more sensors. Showen, et al. takes advantage of the long propagation distance of gunfire to place sensors in a relatively sparse array so that only a few of the sensors can detect the gunfire. This permits the processor to ignore impulsive events which only reach one sensor—a concept called "spatial filtering." This concept of spatial filtering radically reduces the sensor density compared to predecessor systems, which require as many as 80 sensors per square mile.

Another gunshot location system is described in co-pending U.S. patent application Ser. No. 10/248,511 by Patterson, et al., filed Jan. 24, 2003, which is incorporated herein by reference. Patterson, et al., discloses a system wherein audio information is processed within each sensor to detect a gunshot and determine a time of arrival at the sensor. Time of arrival information, as determined from a synchronized clock, is then transmitted wirelessly by each sensor to a computer at a centralized location where a location of the shooter is calculated in the same manner as in the Showen, et al. system.

As yet, azimuthal systems have not been as widely accepted as, for example, the Showen, et al. system. Azimuthal sensors typically employ one or more closely-spaced sensors, where each sensor includes several microphones arranged in a small geometric array. A radial direction can be determined by measuring the differences in arrival times at the various microphones at a particular sensor. Presently such systems suffer from somewhat limited accuracy in the determination of the radial angle, which in turn, translates into significant errors in the positional accuracy when a location is found by finding the intersection of two or more radial lines, from corresponding sensors, directed toward the shooter. Since errors in the radial angle result in ever increasing positional error as the distance from the sensor to the source increases, the reported position will be especially suspect toward the outer limits of the sensors' range.

A concern unaddressed by the present art is a portable system for gunshot detection and location. In particular, an array of portable sensors in combination with individual display devices and a portable server. Patterson, et al. discloses a portable sensor having a belt clip but fails to disclose a portable system.

For example, in a military environment, merely detecting a gunshot and providing a source location at a central location is ineffective. A soldier must be provided the source location in a meaningful manner and in a meaningful time frame to return fire and/or take cover or the system has failed to attain its goal.

Similar issues arise in law enforcement applications during tactical operations such as during sniper incidents, hostage situations, and the like. Rapid deployment is only partially addressed by a wireless sensor. Infrastructure for communication with a server and providing meaningful information to the people who need the information requires more than a mere portable sensor.

Some existing azimuthal sensors are suitable for rapid placement but are not actually portable in the sense that individual soldiers or officers cannot wear or carry the sensors operationally and there is no provision for instantaneous display to the individual solder that is actually being fired upon.

It is thus an object of the present invention to provide a highly portable system for the detection and location of gunfire wherein all components of the system are portable and the system provides near immediate information directly to individuals who are directly in the line of fire.

SUMMARY OF THE INVENTION

The present invention provides a highly portable system for detecting and locating the source of gunfire. In a preferred embodiment, the inventive system includes: a plurality of man wearable acoustic sensors, each such sensor having a display device associated therewith; a host processor for receiving information concerning acoustic events and calculating a source location based on such information; and a communication network for bidirectional communication between sensors and the host processor.

For purposes of this disclosure, the term "man wearable" refers to a sensor which is integrated into a piece of equipment normally carried by a soldier, integrated into an article of clothing, or attached to a piece of equipment or readily attachable to the soldier or an article of clothing via a secure mount such as a latch, loop-and-hook strap, and so on.

In one preferred embodiment, the sensor and the display are separate but associated so that information provided on the display is relevant based on the position of its associated sensor. In one variation, the sensor is incorporated into body armor and consequently, a soldier is burdened with one less piece of equipment.

In another preferred embodiment, the sensor and display are integrated into a common housing such that a single unit is maintained in easy view of the soldier. In one variation, the sensor is incorporated into a helmet. A drop down ocular provides information about the soldier's position and shooter location.

In still another preferred embodiment, the host processor is incorporated into a piece of equipment, or article of clothing, used by a squad leader providing location fixes for acoustic events, administrative overhead of the system, and communication with command centers and other squads.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
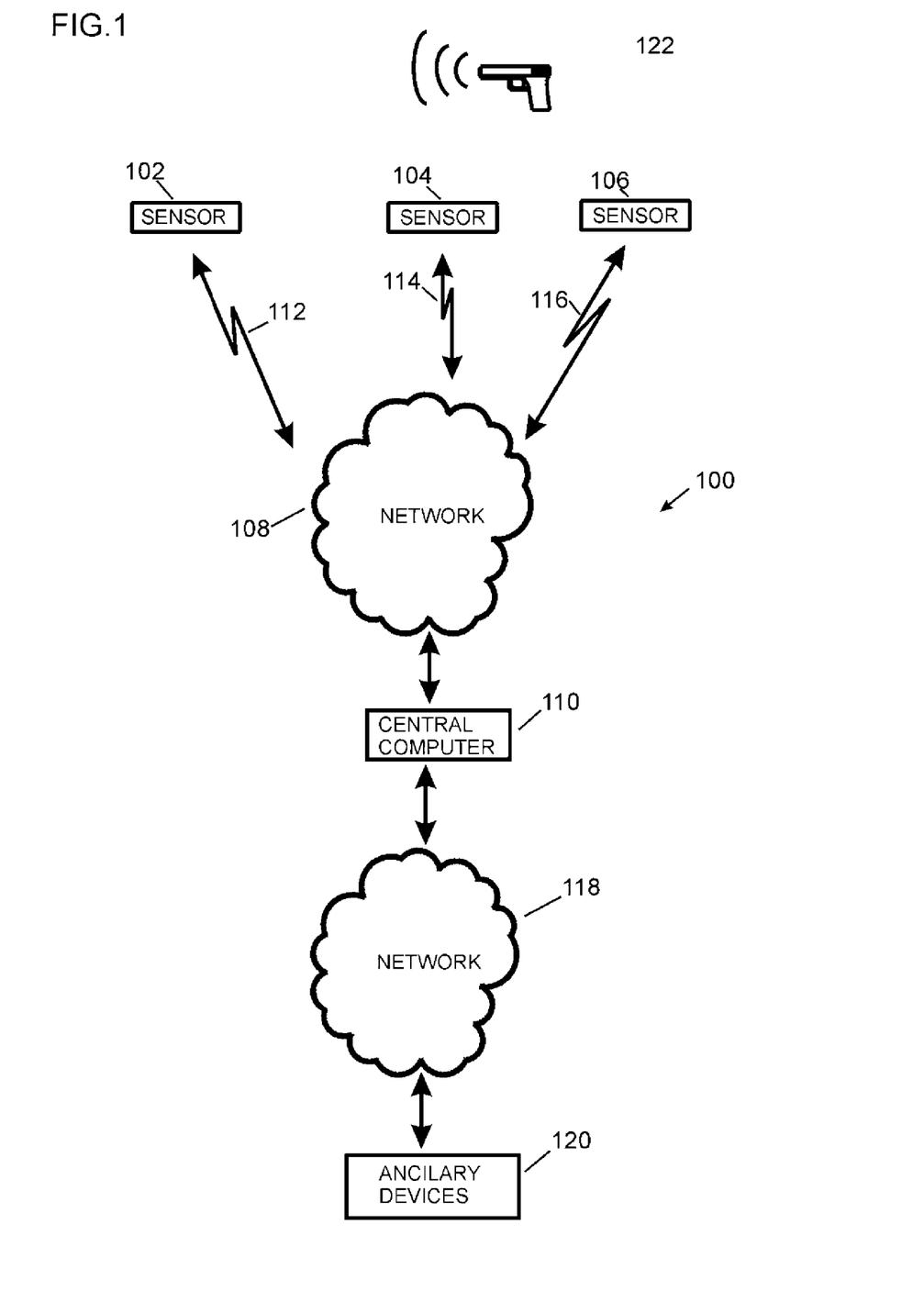
FIG. 1 depicts a preferred configuration of the inventive gunshot detection system.

Referring now to the drawings, wherein like reference numerals indicate the same parts throughout the several views, a representative gunshot detection system 100 is shown in its general environment in FIG. 1. In a preferred embodiment, a plurality of sensors 102-106 are dispersed over a monitored area. Sensors 102-106 may be any combination fixed sensors and/or portable sensors. Preferably, fixed sensors are placed to have a relatively unobstructed acoustic view around in the immediate area. By way of example and not limitation, suitable sites for fixed sensors include: placed atop a building; placed atop utility or light poles; on towers, etc. Typically sensors 102-106 communicate through a communication network 108 with a centralized processor 110 wherein information concerning acoustic events is processed to provide details of the event, such as the source location of a gunshot, time of the gunshot, the number of detected gunshots, the type of event, and the like. It should be noted that sensors 102-106 may be any combination of wired or wireless sensors, that communications paths 112-116 may carry either analog or digital signals, and that network 108 may comprise any combination of sub-networks, such as, by way of example and not limitation: a telephone network; the internet; a private computer network; a wireless network, or even a collection of dedicated wires routed to the sensor array.

To ensure that the monitored area is relevant, in a military environment it may be preferable that sensors 102-106 are man-wearable. In such a system, the host computer 110 and display devices 120 would likely be carried by a squad leader. Other ancillary display devices are preferably provided with each man-wearable sensors to allow the soldier to quickly return fire, or at least take cover. In such a system, other ancillary systems may use data collected by the gunshot location system as reported in real time, or near real time, to higher levels or command centers.

Figure 2:
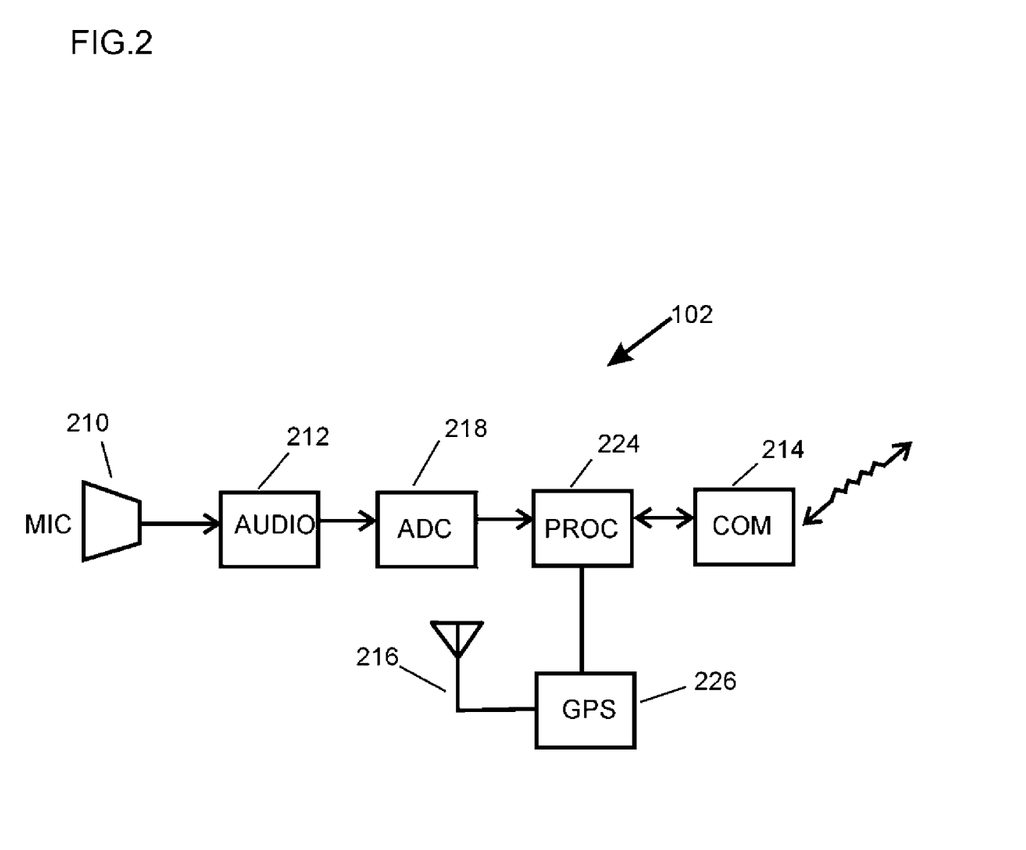
FIG. 2 provides a block diagram of a wireless sensor for use in the inventive gunshot detection system.

Referring to FIG. 2, a preferred embodiment of sensor 102 includes: a microphone for receiving acoustic events; an amplifier 212 and possibly other signal conditioning circuitry; a processor 224, typically a digital signal processor, having an analog to digital converter 218; a GPS receiver 226 and its associated antenna 216; and an interface 214 for communicating via a communication network.

In practice, gunshots are received at microphone 210, the audio signal is conditioned by circuitry 212, digitized by A/D converter 218 and processed to detect gunshots in DSP 224. Upon detecting a gunshot, a time of arrival and sensor position are obtained from GPS receiver 226 and transmitted to a host system via interface 214.

As will be appreciated by those skilled in the art, in a law enforcement environment information about a detected acoustic event is typically output to a person of interest such as a police dispatcher or directly to individual officers, as through network 118 to display devices 120 or a computer console. When weapon 122 is fired, the muzzle blast reaches sensors 102-106 at different times based on the speed of sound and the distance between a sensor and the shooter. Whether the acoustic information is processed at the sensor, or at computer 110, a time of arrival is determined for each sensor and the differences of the various times of arrival are processed to determine a location of the source of the gunshot. In response to the gunshot, information is provided at device 120.

Figure 3:
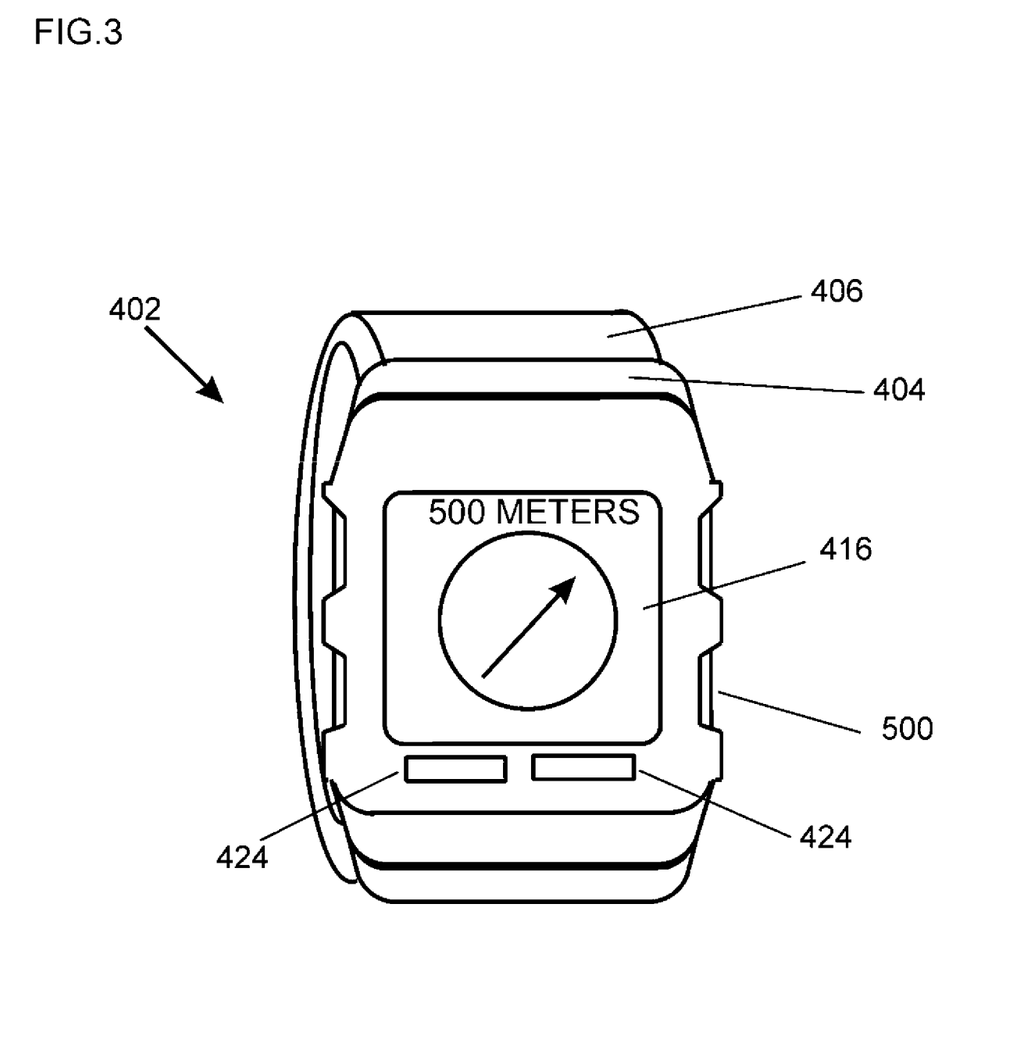
FIG. 3 depicts a preferred embodiment of a sensor or host as incorporated in a wristwatch housing.

One preferred embodiment of a sensor 402 is shown in FIG. 3 wherein the sensor and display 416 are incorporated into a wristwatch housing 500. Preferably GPS and communication antennae are housed internally or incorporated in watchband 406. Buttons 424 allow scrolling through screens of information of display 416 or allow the mode of operation to be changed. Windscreen 404 reduces wind noise received by sensor 402 and protects the microphone (not shown) from minor impacts. In a preferred embodiment, sensor 402 has an exterior color which will blend well with the soldier's uniform and/or the environment.

The wristwatch housing of FIG. 3 may alternatively house a host system and, as such, would typically be worn by a squad leader. In such a configuration, display 416 could be used to display the location of any soldier in the squad, historical details, receive messages up and down the chain of command, as well as display current shooter information when the squad is fired upon.

In addition, the wristwatch of FIG. 3 could be used as a user interface (e.g., display, user input, etc.) for alternate sensor embodiments described herein, such as when the sensor is incorporated into body armor or is shoulder-worn.

Figure 4:
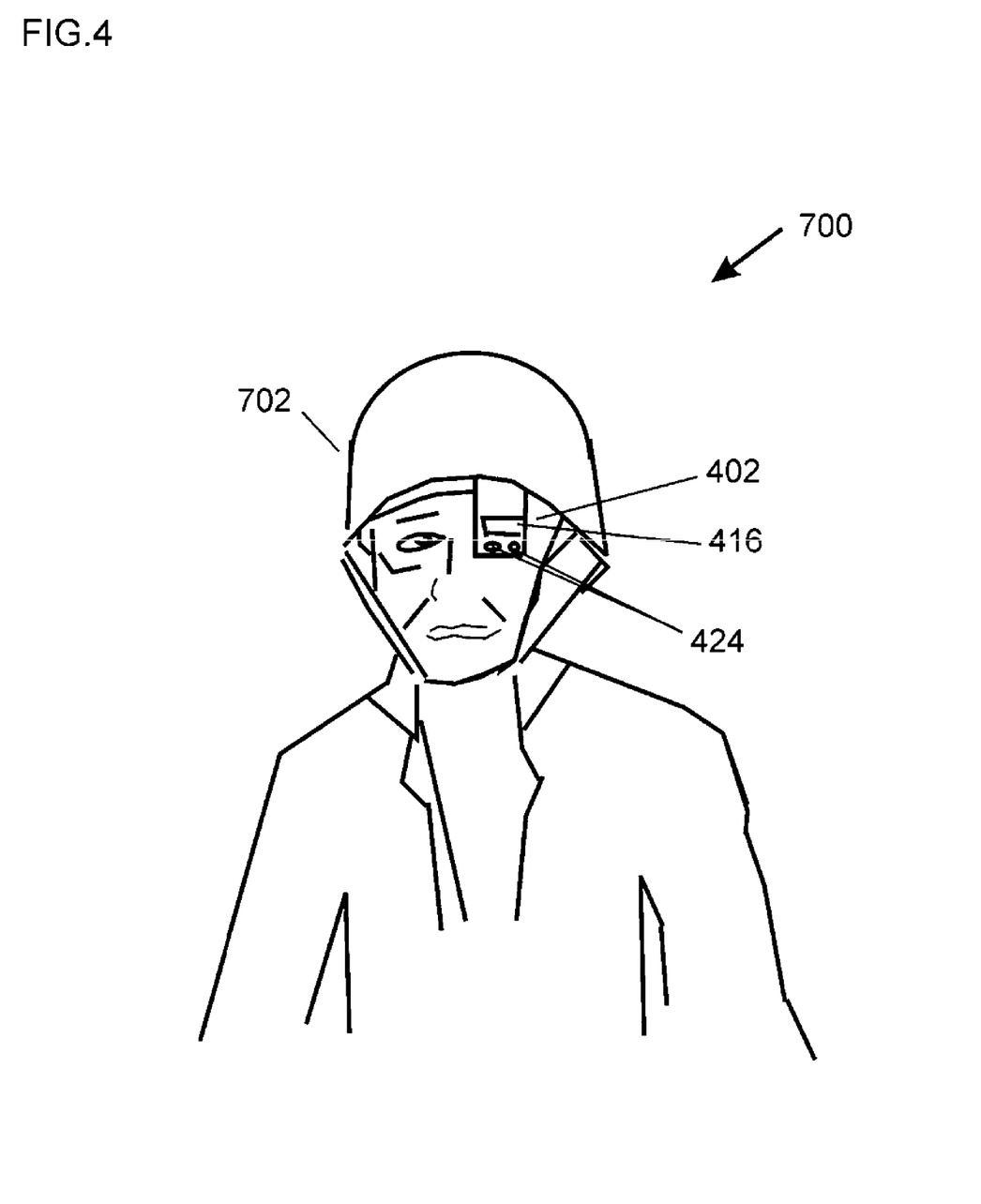
FIG. 4 depicts a preferred embodiment of a sensor or host as incorporated in a helmet.

Turning to FIG. 4, optionally the sensor can be mounted in helmet 700. In such a configuration the components are largely hidden by shell 702. Preferably if shell 702 is formed of a composite material, a GPS patch antenna or phased array is laminated directly in shell 702. Sensor 402 (e.g., flip-down visor or wristwatch) provides a display 416 for soldier location, shooter location when a gunshot is detected, messages from the squad leader, etc. Buttons 424 allow scrolling between screens and/or mode changes as the user desires. As with the wristwatch embodiment, helmet 700 may alternatively house the host processor, in which case visor 402 can be used to display administrative information, individual soldier positions, and the like, as well as shooter location when the squad comes under fire. In another configuration, visor sensor 402 can be used to display information from other systems, as a night vision display, or even as a display for gunshot detection sensors incorporated into body armor or otherwise worn by the soldier.

Figure 5:
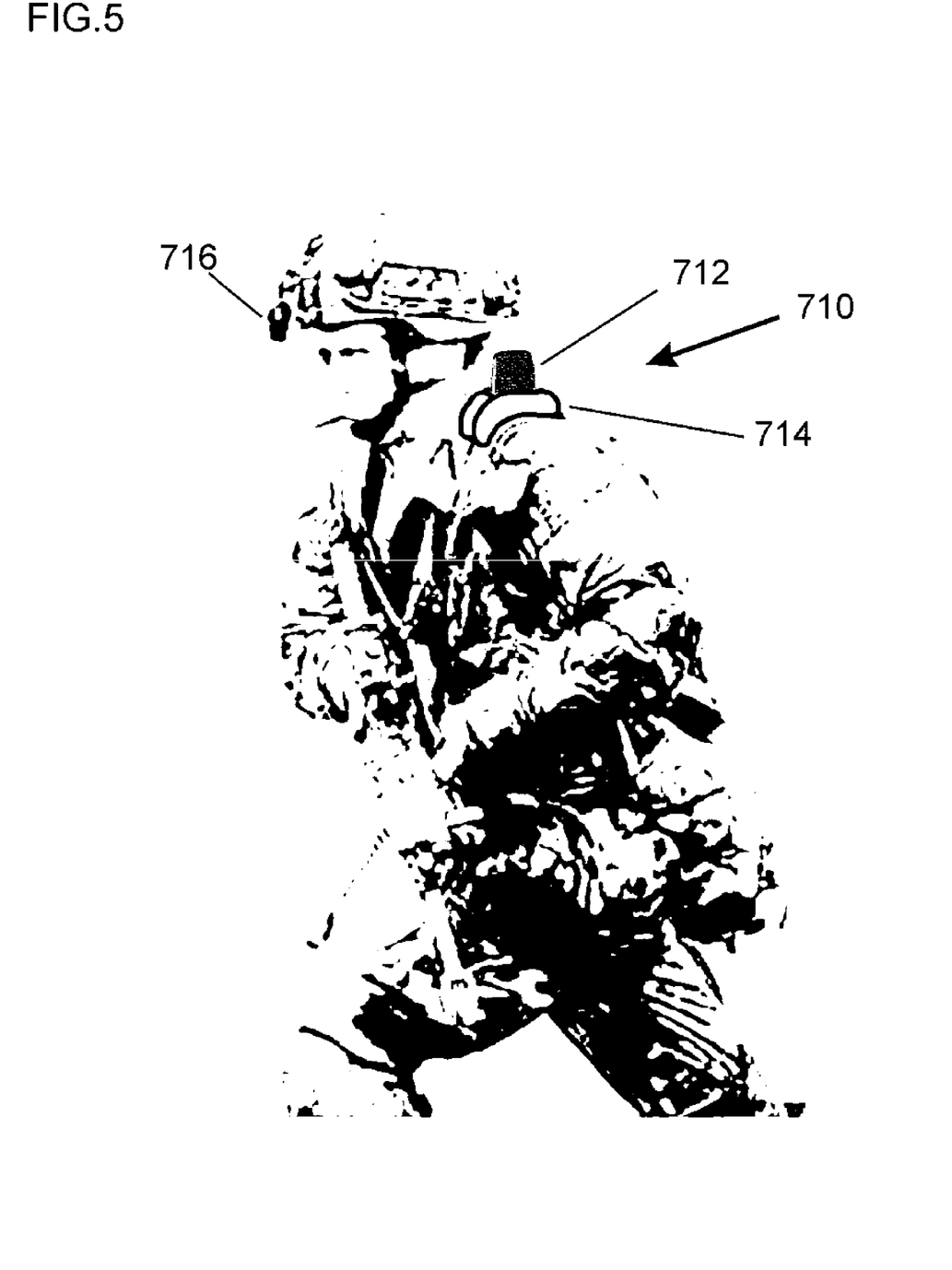
FIG. 5 depicts a preferred embodiment of a shoulder mounted sensor or host.

FIG. 5 shows a gunshot detection sensor 710 in a shoulder mounted configuration. Windscreen 712 protects a microphone and preferably GPS and radio antennae. Housing 714 may be rounded to conform to the soldier's shoulder. Since sensor 710 is not readily viewable by the soldier, it is contemplated that sensor 710 will associate with an external display such as headgear mounted display 716.

Figure 6:
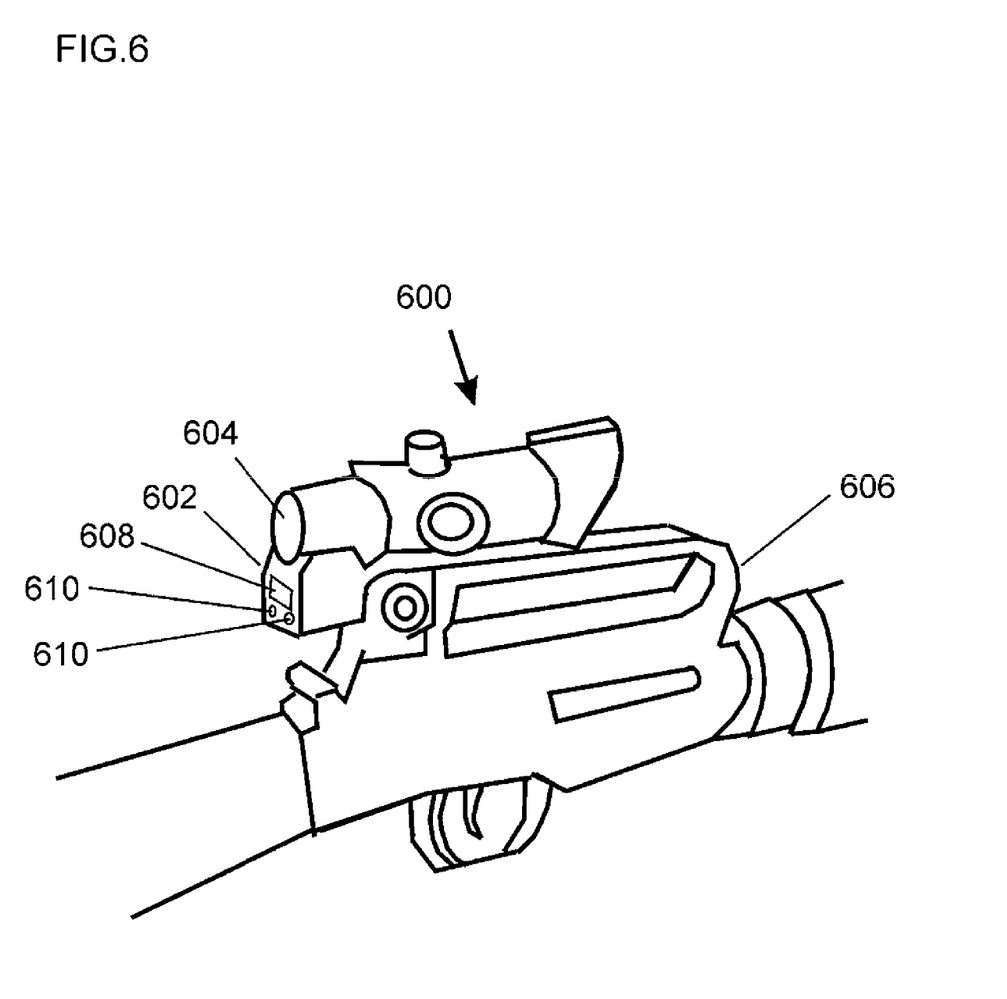
FIG. 6 depicts a preferred embodiment of a gun mounted sensor or host.

Turning next to FIG. 6, sensor 602 may also be mounted to a rifle or other firearm 606. In a preferred embodiment, sensor 602 mounts proximate scope 600 for convenience of the soldier. Information is presented on display 608 and switches 610 may be used to scroll through various screens and/or change operating modes of sensor 602. In one preferred embodiment, scope 600 includes a graphic display which overlays the image seen through ocular 604 such that targeting information is visually provided in the soldier's scope as a target is sighted. Preferably the housing of sensor 602 is of a color and material to blend well with rifle 606 and has rounded corners so as not to catch on obstructions. Sensor 602 may also provide host functions for other sensors. Scope 600 may also be configured for night vision use.

Figure 7:
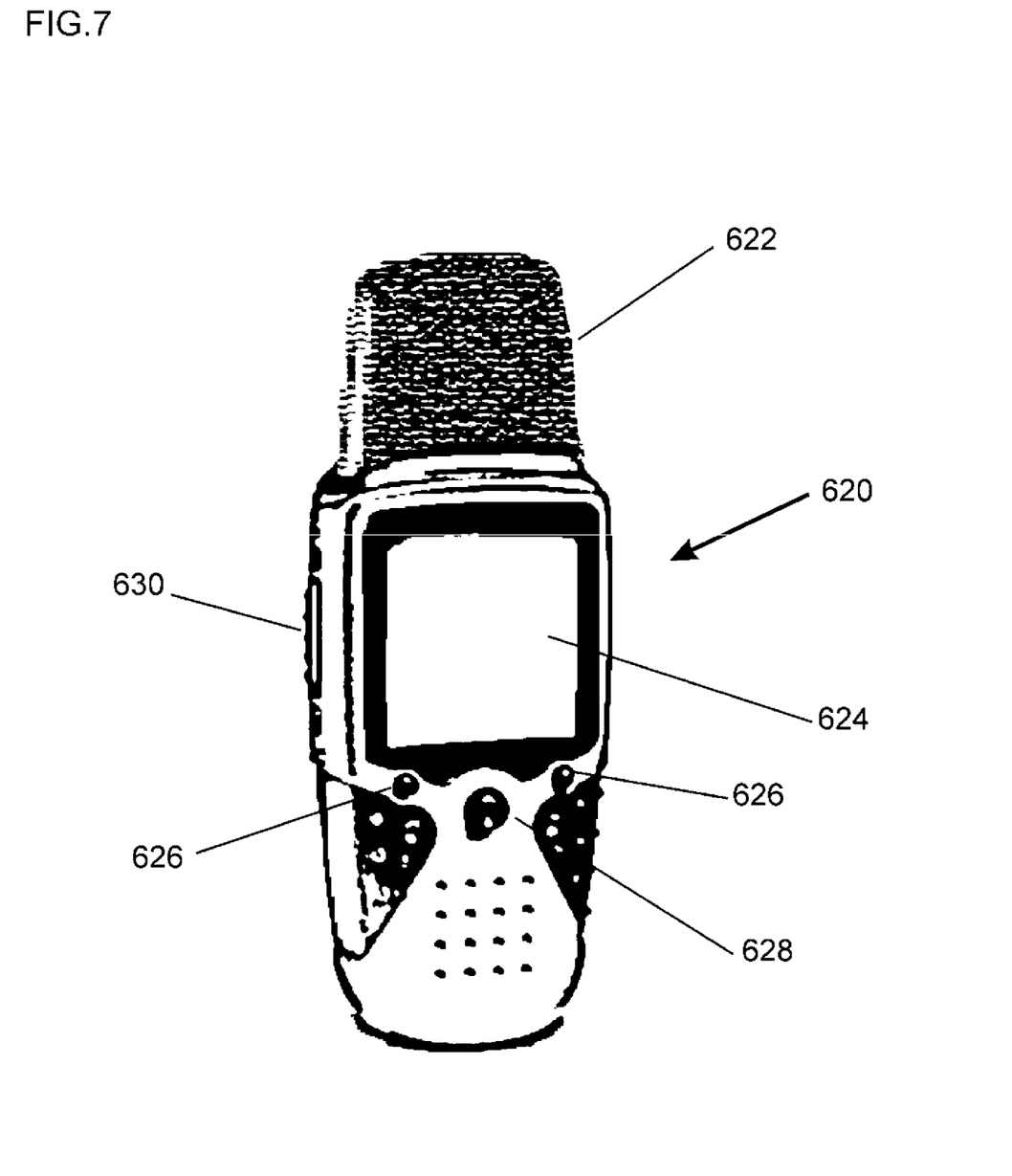
FIG. 7 depicts a preferred embodiment of a sensor or host incorporated in a walkie-talkie.

Referring next to FIG. 7, wherein is shown a walkie-talkie/acoustic sensor combination 620. Device 620 includes windscreen 622 for protecting a microphone and antennae for the GPS, radio, and sensor communication network. Display 624 provides display of operating information for radio operations, GPS operation, and sensor operation. Buttons 626 and joystick 628 allow navigation through the various information and screens displayed on display 624. A push-to-talk button 630 provides control of audio transmissions. As will be apparent to those skilled in the art, a single microphone can be used to monitor environmental sounds to detect gunshots and for receiving voice for walkie-talkie transmissions. Since device 620 can accommodate a relatively large display 624, device 620 is well suited for use as a host where more information, or simultaneous information may need to be displayed. Device 620 may also receive text messages or even images for output on display 624.

Figure 8:
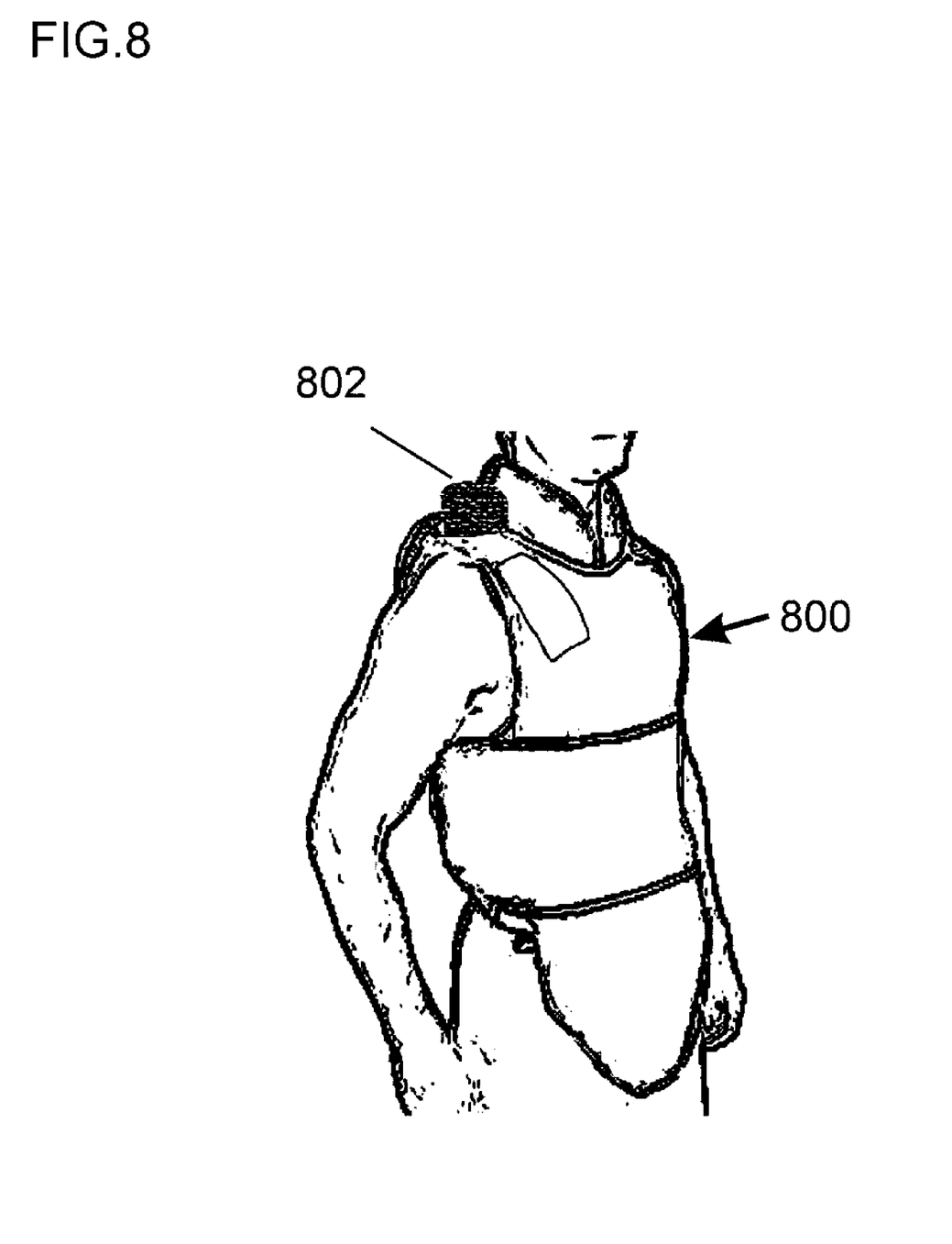
FIG. 8 depicts a preferred embodiment of a sensor or host as incorporated into body armor.

FIG. 8 shows a sensor for a gunshot detection system integrated into body armor 800. The components of the sensor are largely hidden within body armor 800. Windscreen 802 protects the microphone while antennae for the GPS receiver and communication are internal to the vest 800. The circuitry for the sensor is preferably embedded within vest 800. Embodiment 800 is particularly well suited for use as a host node since there is considerable area for the added circuitry. Preferably body armor 800 is used with a wristwatch display, helmet-mounted display, or rifle scope display.

It should be noted that when a sensor, or host, is used with an external or associated display, as opposed to an integrated display, that a communication means is required between the sensor and the display. By way of example and not limitation suitable communication means include: a digital radio link; infrared; wireless Ethernet; Bluetooth; and the like. Preferably suck a link is of minimal power and transmits intermittently to avoid detection by opposing forces.

It should also be noted that while preferred embodiments of the present invention have been described in connection with gunshot location systems, the techniques for providing a convenient means for equipping a soldier or police officer with a wearable gunshot detection sensor can be applied to other types of systems, such as those monitoring health conditions, environmental conditions, and the like.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the scope and spirit of this invention.

What is claimed is:

1. A method of processing gunshot location information associated with a portable acoustic sensor, the method comprising:
   detecting an acoustic event at a microphone associated with the portable acoustic sensor, wherein the sensor has a housing configured for portable operation in association with a person;
   determining, via a processor in communication with the microphone and contained within or attached to the housing, a time of arrival for the acoustic event;
   providing position information regarding the sensor to the processor via a GPS receiver in communication with the processor;
   determining a source location of the gunshot as a function of sensor data including time of arrival information as to when a muzzle blast impulse caused by discharge of the gunshot was detected, wherein muzzle blast time of arrival data is used in providing direction information including a direction from the portable acoustic sensor towards the source location of the gunshot; and
   displaying the source location on a display associated with the portable acoustic sensor.

2. The method of claim 1 wherein the housing comprises a wristwatch housing.

3. The method of claim 1 wherein the housing comprises a helmet.

4. The method of claim 1 wherein the housing comprises a vest.

5. The method of claim 4 wherein the sensor includes a display that is not housed in said housing and the display is associated with a particular sensor to display information relevant to said particular sensor.

6. The method of claim 5 wherein the display comprises a wristwatch.

7. The method of claim 1 further comprising interfacing the sensor with a wireless network interface housed in or attached to the housing.

8. The method of claim 1 wherein said housing is configured for attachment to a weapon.

9. The method of claim 1 wherein the housing comprises a rifle scope.

10. The method of claim 1 wherein the housing comprises a two-way radio.

11. The method of claim 1 wherein the housing comprises body armor.

12. A method of processing gunshot location information associated with a portable acoustic sensor, the method comprising:

detecting an acoustic event via a microphone associated with the portable acoustic sensor, wherein the sensor has a housing configured for portable operation in association with a person;

determining, via a processor in communication with the microphone and contained within or attached to the housing, a time of arrival for the acoustic event;

providing position information to the processor via a GPS receiver in communication with the processor;

networking the portable acoustic sensor with a plurality of sensors positioned apart from each other in an array such that the gunshot location is calculated as a function of time of arrival information of a muzzle blast detected at each of the plurality of sensors, such that a location of the gunshot may be determined using only muzzle blast time of arrival data; and receiving information related to the source of the gunshot for display on a display associated with the portable acoustic sensor.

13. The method of claim 12 wherein the GPS receiver communicates a position of the sensor to the processor.

14. The method of claim 13 wherein the networking is performed via a network interface configured to connect to an ethernet network.

15. The method of claim 12 wherein the sensor comprises an integrated power supply for supplying electrical power to the sensor.

16. The method of claim 15 wherein the power supply comprises a battery.

17. The method of claim 12 wherein the networking is performed via a network interface comprising a radio frequency transceiver.

18. The method of claim 12 wherein the housing is configured to be man wearable.

19. The method of claim 18, further comprising displaying location information of the acoustic event to a user.

20. The method of claim 19 wherein the location information comprises location information of the source of the acoustic event.

21. The method of claim 18, further comprising displaying location information of another portable sensor.

22. The method of claim 12, further comprising displaying location information of the gunshot to a user.

23. The method of claim 22 wherein the location information comprises location information of the source of the acoustic event.

24. The method of claim 12 further comprising displaying location information of another portable sensor.

25. The method of claim 12 wherein the housing is configured to be man wearable.

26. The method of claim of 12, further comprising communicating the position information and the time of arrival to a gunshot location system via a wireless network interface associated with the sensor.

27. A method of processing gunshot location information associated with a portable acoustic sensor, the method comprising:

detecting an acoustic event via microphones associated with the portable acoustic sensor, wherein the sensor has a housing configured for portable operation in association with a person;

determining, via a processor in communication with the microphones and contained within or attached to the housing, a time of arrival for the acoustic event;

providing position information to the processor via a GPS receiver in communication with the processor;

networking the portable acoustic sensor with a plurality of sensors positioned apart from each other in an array such that the gunshot location is calculated as a function of time of arrival information of a muzzle blast detected at each of the plurality of sensors, such that a location of the gunshot may be determined using only muzzle blast time of arrival data; and processing information related to the source of the gunshot for display on a display associated with the portable acoustic sensor;

wherein the information for display on the display comprises location information of the source of the acoustic event.

28. A portable acoustic sensor including computer readable storage media containing instructions executable to perform a method of processing gunshot location information associated with a portable acoustic sensor, the method comprising:

detecting an acoustic event via an array of microphones associated with the portable acoustic sensor, wherein the sensor has a housing configured for portable operation in association with a person;

determining, via a processor in communication with the microphone and contained within or attached to the housing, a time of arrival for the acoustic event;

providing position information regarding the sensor to the processor via a GPS receiver in communication with the processor;

determining a source location of the gunshot as a function of sensor data including time of arrival information as to when a muzzle blast impulse caused by discharge of the gunshot was detected, wherein muzzle blast time of arrival data is used in providing direction information including a direction from the portable acoustic sensor towards the source location of the gunshot; and displaying the source location on a display associated with the portable acoustic sensor;

wherein the housing is configured to be man wearable.

* * * * *